United States Patent
Yashiro et al.

(10) Patent No.: US 8,927,082 B2
(45) Date of Patent: Jan. 6, 2015

(54) OPTICAL RECORDING MEDIUM AND METHOD FOR MANUFACTURING THE SAME

(75) Inventors: Tohru Yashiro, Yokosuka (JP); Satoshi Mizukami, Sagamihara (JP)

(73) Assignee: Ricoh Company, Ltd., Tokyo (JP)

( * ) Notice: Subject to any disclaimer, the term of this patent is extended or adjusted under 35 U.S.C. 154(b) by 965 days.

(21) Appl. No.: 12/279,946

(22) PCT Filed: Feb. 15, 2007

(86) PCT No.: PCT/JP2007/053234
§ 371 (c)(1),
(2), (4) Date: Aug. 19, 2008

(87) PCT Pub. No.: WO2007/097381
PCT Pub. Date: Aug. 30, 2007

(65) Prior Publication Data
US 2010/0221482 A1    Sep. 2, 2010

(30) Foreign Application Priority Data

Feb. 21, 2006 (JP) .................................. 2006-043599
Feb. 1, 2007 (JP) .................................. 2007-023511

(51) Int. Cl.
| G11B 7/24 | (2013.01) |
| G11B 7/2492 | (2013.01) |
| G11B 7/246 | (2013.01) |
| G11B 7/2472 | (2013.01) |
| G11B 7/2463 | (2013.01) |
| G11B 7/2467 | (2013.01) |
| G11B 7/248 | (2006.01) |
| G11B 7/2531 | (2013.01) |

(Continued)

(52) U.S. Cl.
CPC .............. *G11B 7/2492* (2013.01); *G11B 7/246* (2013.01); *G11B 7/2472* (2013.01); *G11B 7/2463* (2013.01); *G11B 7/2467* (2013.01); *G11B 7/248* (2013.01); *G11B 7/2531* (2013.01); *G11B 7/2533* (2013.01); *G11B 7/2534* (2013.01); *G11B 7/2536* (2013.01); *G11B 7/256* (2013.01); *G11B 7/2578* (2013.01); *G11B 7/259* (2013.01); *G11B 2007/24612* (2013.01); *G11B 2007/25706* (2013.01); *G11B 2007/2571* (2013.01); *G11B 2007/25715* (2013.01); *G11B 2007/25716* (2013.01); *G11B 2007/25718* (2013.01)
USPC .................. 428/64.4; 428/64.8; 430/270.16; 430/270.2

(58) Field of Classification Search
CPC .... G11B 7/246; G11B 7/2472; G11B 7/2492; G11B 2007/24612; G11B 2007/24705; G11B 2007/24905

USPC .............. 428/64.4, 64.8; 430/270.16, 270.19, 430/270.2
See application file for complete search history.

(56) References Cited

U.S. PATENT DOCUMENTS

| 5,318,882 | A  | * | 6/1994  | Ootaguro et al. | 430/270.19 |
| 5,968,708 | A  | * | 10/1999 | Yashiro et al. | 430/270.1 |
| 6,660,867 | B2 | * | 12/2003 | Shimizu et al. | 548/105 |
| 6,737,143 | B2 |   | 5/2004  | Noguchi et al. | |
| 6,794,005 | B2 | * | 9/2004  | Noguchi et al. | 428/64.1 |
| 6,936,323 | B2 |   | 8/2005  | Noguchi et al. | |
| 6,979,413 | B2 | * | 12/2005 | Kaida et al. | 252/299.61 |
| 2003/0157291 | A1 | | 8/2003 | Noguchi et al. | |
| 2003/0206514 | A1 | | 11/2003 | Noguchi et al. | |
| 2004/0265645 | A1 | | 12/2004 | Noguchi et al. | |

FOREIGN PATENT DOCUMENTS

| JP | 2-42652   | 2/1990  |
| JP | 2594443   | 12/1996 |
| JP | 9-66671   | 3/1997  |
| JP | 9-169166  | 6/1997  |

(Continued)

*Primary Examiner* — Gerard Higgins
(74) *Attorney, Agent, or Firm* — Cooper & Dunham LLP (57) ABSTRACT

To provide an optical recording medium including: a substrate having at least one of grooves and pits on a surface thereof; and a dye recording layer formed over the substrate, wherein the dye recording layer comprises a cyanine dye represented by the following General Formula (I), a squaric acid complex represented by the following General Formula (II), and an amine compound.

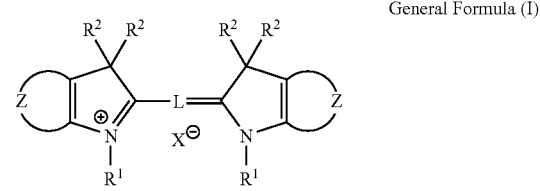

General Formula (I)

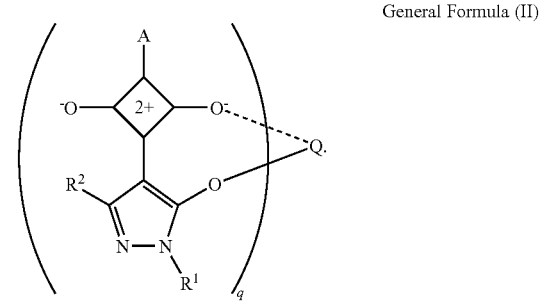

General Formula (II)

7 Claims, 2 Drawing Sheets

(51) Int. Cl.
  *G11B 7/2533* (2013.01)
  *G11B 7/2534* (2013.01)
  *G11B 7/2536* (2013.01)
  *G11B 7/256* (2006.01)
  *G11B 7/2578* (2013.01)
  *G11B 7/259* (2013.01)
  *G11B 7/257* (2013.01)

(56) References Cited

FOREIGN PATENT DOCUMENTS

| | | |
|---|---|---|
| JP | 11-48612 | 2/1999 |
| JP | 2000-345059 | 12/2000 |
| JP | 2002-370453 | 12/2002 |
| JP | 2002-370454 | 12/2002 |
| JP | 2003-305958 | 10/2003 |
| JP | 2003-335060 | 11/2003 |
| JP | 2004-330459 | 11/2004 |
| JP | 3659922 | 3/2005 |
| JP | 3698708 | 7/2005 |
| JP | 2005-319728 | 11/2005 |
| JP | 2006-150856 | 6/2006 |
| JP | 2006-264241 | 10/2006 |
| JP | 2006-264242 | 10/2006 |
| WO | WO02/50190 A1 | 6/2002 |

* cited by examiner

OPTICAL RECORDING MEDIUM AND METHOD FOR MANUFACTURING THE SAME

TECHNICAL FIELD

The present invention relates to an optical recording medium having a dye recording layer, and a manufacturing method for the same.

BACKGROUND ART

In addition to such optical recording media as Compact Disc Read-Only Memory (CD-ROM), recordable CDs (CD-Rs and CD-RWs) are now commercialized and widely used.

In contrast to conventional CDs, CD-Rs and CD-RWs feature that the user can write to them and signals generated following recording are designed to meet the conventional CD standards so that they can be played on CD players available on the market.

As a method of achieving fabrication of such recording media, for example, Patent Literature 1 discloses a method of manufacturing a CD-R disc by applying a dye over a substrate by spin coating to form a light-absorbing layer and providing a metallic reflective layer on the light-absorbing layer.

Dye-based materials are used as the materials of the light-absorbing layer.

One feature of CD-R is its high reflectance (65%), which meets the CD standards. For the purpose of obtaining high reflectance with the foregoing disc configuration, the light-absorbing layer needs to have a specific complex refractive index over a wavelength range of the laser beam source for recording and reproduction, and utilization of dye's light absorption property is suitable for achieving this.

Figure 1:
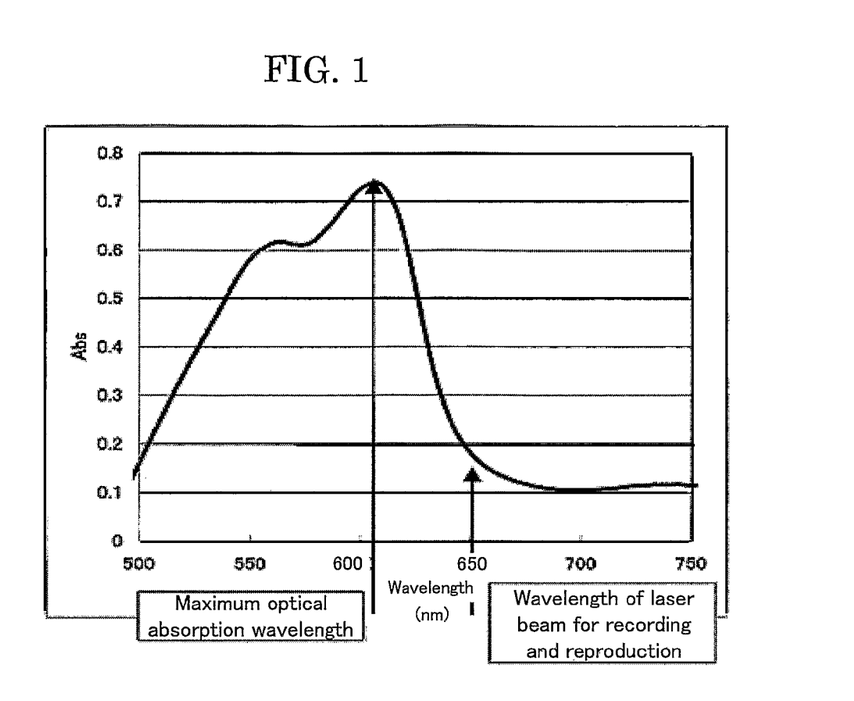
FIG. 1 shows an absorption spectrum of a dye film.

As shown in FIG. 1, however, there is a problem that the complex refractive index is greatly dependent on the wavelength because it utilizes the feature of the absorption band end in the light absorption spectrum of the dye film.

As next-generation recording media, DVD-R and DVD+R, are commercialized that are capable of high-density recording and/or reproduction by using a laser beam with a wavelength of around 650 nm rather than using a conventional laser beam with a wavelength of around 780 nm designed for CD. The performance of recording material containing the foregoing dye for CD-R (e.g., pentamethine cyanine dyes or phthalocyanine dyes) is largely dependent on the wavelength of the laser beam; therefore, it results in failure to satisfy recording/reproduction characteristics at 650 nm. This is due to a large absorption coefficient (k) at 650 nm and low reflectance, which makes information recording/reproduction difficult.

To overcome this problem, organic dyes such as trimethine cyanine dyes, azo dyes and tetra-azaporhirazine are proposed as materials for recoding layer which adjust the range of the absorption wavelength of dyes or recording materials. These dyes are disclosed for instance in Patent Literatures 2, 3, 4, and 5.

Along with a recent increase in the recording velocity for recordable DVD discs, improvements are made also on recording materials; examples are squaric acid complexes and trimethine cyanine dye materials, which are disclosed for instance in Patent Literatures 6, 7, and 8.

Even with these recording materials, however, it is difficult to achieve high-speed recording characteristics and archivability (durability) at the same time. The reason for this is that although recording materials that exhibit low thermal decomposition temperatures and high decomposition rates are preferred, these materials are likely to cause a reduction in heat resistance and wet resistance. Generally, two or more dye materials are mixed to avoid this, which however leads to the problem described below.

While a dye recording film is deposited by application of its coating solution by spin coating, the coating solution being obtained by dissolving a dye in solvent, the combined use of two or more different recording materials—for example, a coating solution containing a cyanine dye with ionic structure and a squalene compound with chelate structure—is more likely to cause interactions such as exchange reactions in the mixture, resulting in failure to obtain desired characteristics due to chemical changes.

In particular, the $PF_6^-$ ion, an anion in the cyanine dye, is so reactive that it tends to cause dechelation of squaric acid complex, for example.

(Patent Literature 1) Japanese Patent Application Laid-Open (JP-A) No. 02-42652

(Patent Literature 2) Japanese Patent (JP-B) No. 2594443

(Patent Literature 3) Japanese Patent Application Laid-Open (JP-A) No. 09-169166

(Patent Literature 4) Japanese Patent Application Laid-Open (JP-A) No. 09-66671

(Patent Literature 5) Japanese Patent Application Laid-Open (JP-A) No. 11-48612

(Patent Literature 6) International Publication No. WO2002/050190

(Patent Literature 7) Japanese Patent (JP-B) No. 3698708

(Patent Literature 8) Japanese Patent (JP-B) No. 3659922

DISCLOSURE OF THE INVENTION

It is an object of the present invention to solve the foregoing problems and to provide an optical recording medium having a dye recording layer, which the medium is excellent in recording characteristics, durability, and productivity, and a method of manufacturing the optical recording medium.

The present invention is based on the findings by the present inventors, and means of solving the foregoing problems are as follows:

<1> An optical recording medium including: a substrate having at least one of grooves and pits on a surface thereof; and a dye recording layer formed over the substrate, wherein the dye recording layer comprises a cyanine dye represented by the following General Formula (I), a squaric acid complex represented by the following General Formula (II), and an amine compound:

General Formula (I)

wherein $R^1$ and $R^2$ independently represent an alkyl group which may be substituted, an aryl group which may be substituted, or a benzyl group which may be substituted, Z represents an atom group for forming an aromatic ring, X represents a monovalent anion, and L represents a linking group for forming a carbocyanine,

General Formula (I)

wherein $R^1$ and $R^2$ independently represent an alkyl group which may be substituted, an aryl group which may be substituted, or a benzyl group which may be substituted, Z represents an atom group for forming an aromatic ring, X represents a monovalent anion, and L represents a linking group for forming a carbocyanine, General Formula (II)

wherein $R^1$ and $R^2$, which may be identical or different, are an alkyl group which may be substituted, an aralkyl group which may be substituted, an aryl group which may be substituted, or a heterocyclic ring which may be substituted, Q represents a metal atom which has a coordinating property, q represents an integer of 2 or 3, and A represents an aryl group which may be substituted, a heterocyclic ring which may be substituted, or Y=CH— (where Y represents an aryl group which may be substituted or a heterocyclic ring which may be substituted).

General Formula (II)

wherein $R^1$ and $R^2$, which may be identical or different, are an alkyl group which may be substituted, an aralkyl group which may be substituted, an aryl group which may be substituted, or a heterocyclic ring which may be substituted, Q represents a metal atom which has a coordinating property, q represents an integer of 2 or 3, and A represents an aryl group which may be substituted, a heterocyclic ring which may be substituted, or Y=CH— (where Y represents an aryl group which may be substituted or a heterocyclic ring which may be substituted).

Since the recording layer contains at least the foregoing cyanine dye, squaric acid complex and amine compound, it is possible to prevent interaction of dye with other ingredients upon mixed and thus to provide an optical recording medium with a dye layer, which is excellent in recording characteristics, durability, and productivity.

<2> The optical recording medium according to <1>, wherein the cyanine dye in the recording layer has $PF_6^-$ as an anion. By using $PF_6^-$ as the anion of the cyanine dye of the dye recording medium, it is possible to provide an optical recording medium which is excellent in high-speed recording performance.

<3> The optical recording medium according to <1>, wherein the content of the amine compound in the recording layer is 10% by mass or less.

If the content of the amine compound in the dye recording layer is 10% or less, it is possible to ensure stability upon dye mixing without causing a reduction in recording characteristics.

<4> The optical recording medium according to one of <1> and <2>, wherein the amine compound is a nitrogen-containing heterocyclic compound.

When the amine compound is a nitrogen-containing heterocyclic compound, the thermal decomposition temperature of the dye recording layer increases and it is possible to provide an optical recording medium with excellent heat resistance.

<5> A method for manufacturing an optical recording medium, including: applying over a surface of a substrate a solvent in which at least a cyanine dye represented by the following General Formula (I), a squaric acid complex represented by the following General Formula (II), and an amine compound are dissolved, to thereby form a dye recording layer over the substrate, wherein the optical recording medium comprises the substrate having at least one of grooves and pits on a surface thereof, and the dye recording layer formed over the substrate:

With this method of the present invention, it is possible to prevent interaction of dye with other ingredients upon mixed. Thus, the method of the present invention provides excellent productivity.

<6> The method for manufacturing an optical recording medium according to <5>, wherein the amine compound is a liquid tertiary amine.

The use of a liquid tertiary amine in the method of the present invention results in a high effect of preventing interactions of dye with other ingredients when mixed. In addition, since the amine compound is a liquid, the amine compound is not contained in the resultant recording layer and hence it is possible to bring about the effect of the present invention.

<7> The method for manufacturing an optical recording medium according to one of <5> and <6>, wherein the solvent is a fluorine-substituted alcohol.

Fluorine-substituted alcohols have high solubility, providing excellent productivity when used in the preparation of a coating solution for a recording layer in the method of the present invention.

BEST MODE FOR CARRYING OUT THE INVENTION

Operation

Figure 2:
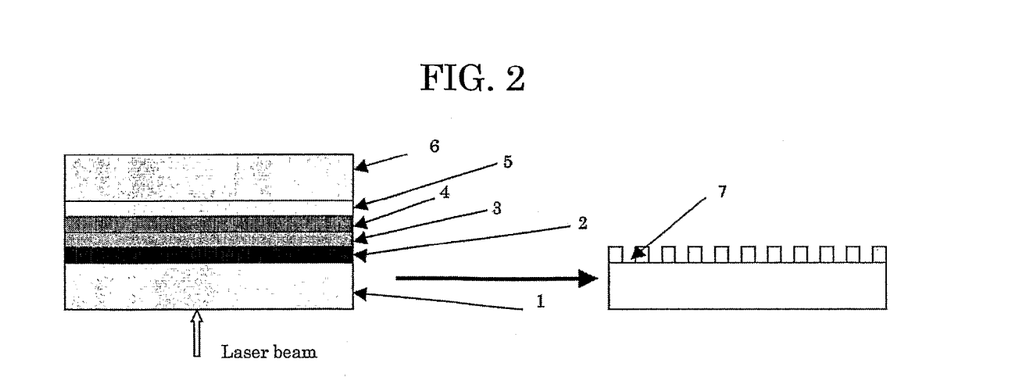
FIG. 2 shows an example of a layer configuration of a DVD+R or DVD-R disc.

FIG. 2 shows an example of a layer configuration of a DVD+R or DVD-R Disc.

In this drawing, reference numeral 1 denotes a substrate; 2 a recording layer made of dye; 3, a reflective layer; 4, a protective layer; 5, an adhesive layer; 6, a cover substrate; and 7, a groove. Information is recorded on or reproduced from the disc by irradiation with laser beam light from the substrate 1 side. The substrate 1 has a groove formed over the surface.

One of the features of such recording media as DVD+R and CD-R that can be played on CD players is that the track information is embedded in the form of wobbling grooves or pits.

The degree of wobbling can be detected as a wobble signal from a track signal. Track information is previously recorded in the substrate by modulating a given frequency by FM modulation or phase modulation.

The track information includes address information and disc rotation frequency information. When the wobble signal is to be detected from the track signal, it is easy to distinguish the wobble signal from information data signals and to obtain ROM signal compatibility.

The present invention relates to the dye recording layer materials described above. The optical recording medium of the present invention is an optical recording medium having at least a dye recording layer over a substrate which has at least one of grooves and pits formed on a surface thereof, wherein the recording layer comprises at least a cyanine dye represented by the foregoing General Formula (I), a squaric acid complex represented by the foregoing General Formula (II), and an amine compound.

Cyanine dyes represented by General Formula (I) and squaric acid complexes represented by General Formula (II) have excellent performance as recording materials for DVD.

In particular, among cyanine dyes represented by General Formula (I), those represented by the following Formula (3) with various combinations of substituents listed in Table 1, which have $PF_6^-$ as an anion, are generally used because their thermal decomposition property is suitable for high-speed recording.

However, ions such as $PF_6^-$ causes an increase in acidity of coating solution when mixed with a squaric acid complex, thereby dechelating the squaric acid complex.

Formula (3)

TABLE 1

| | | | | Dye structure | | | | | | |
|---|---|---|---|---|---|---|---|---|---|---|
| No. | $R^1$ | $R^2$ | $R^3$ | $R^4$ | $R^5$ | $R^6$ | $R^7$ | $R^8$ | p | q |
| No. 1 | $CH_3$ | $CH_3$ | Benzyl | $CH_3$ | Benzyl | $CH_3$ | Naphthyl | Naphthyl | | |
| No. 2 | i-Pr | i-Pr | Benzyl | $CH_3$ | Benzyl | $CH_3$ | Naphthyl | Naphthyl | | |
| No. 3 | $CH_3$ | $CH_3$ | $CH_3$ | $CH_3$ | $CH_3$ | $CH_3$ | Naphthyl | Naphthyl | | |
| No. 4 | $CH_3$ | $CH_3$ | $CH_3$ | $CH_3$ | $CH_3$ | $CH_3$ | Cl | Cl | 1 | 1 |
| No. 5 | Benzyl | Benzyl | Benzyl | $CH_3$ | Benzyl | $CH_3$ | $CH_3$ | $CH_3$ | 1 | 1 |
| No. 6 | Ph | Ph | $CH_3$ | $CH_3$ | $CH_3$ | $CH_3$ | $OCH_3$ | $OCH_3$ | 1 | 1 |
| No. 7 | $C_2H_5$ | $C_2H_5$ | Benzyl | Benzyl | Benzyl | Benzyl | H | H | | |
| No. 8 | $CH_3$ | $CH_3$ | Cyclohexyl | | $CH_3$ | $CH_3$ | Naphthyl | Naphthyl | | |

In Table 1 "Ph" denotes a phenyl group, "$CH_3$" denotes a methyl group, "Cl" denotes a chlorine atom, "i-Pr" denotes an isopropyl group, "Cyclohexyl" denotes a six-member ring formed of $R^3$ and $R^4$ combined together, and "Naphthyl" denotes a naphthyl group formed together with a benzene ring.

For example, the No. 1 cyanine in Table 1 has a structure represented by the Formula (4) below.

Formula (4)

Specific examples of squaric acid complexes represented by General Formula (II) are compounds represented by the following Formula (5) with various combinations of substituents listed in Table 2.

Formula (5)

TABLE 2

| | Dye structure | | | | | | | | |
|---|---|---|---|---|---|---|---|---|---|
| No. | $R^1$ | $R^2$ | $R^3$ | $R^4$ | $R^5$ | $R^6$ | p | Q | q |
| No. 1 | Ph | $CF_3$ | $CH_3$ | $CH_3$ | $CH_3$ | Naphthyl | | Al | 3 |
| No. 2 | Ph | $CF_3$ | $CH_3$ | $CH_3$ | Benzyl | $CH_3$ | 1 | Al | 3 |
| No. 3 | Ph | $CF_3$ | $CH_3$ | $CH_3$ | $CH_3$ | $CH_3$ | 1 | Al | 3 |
| No. 4 | Ph | $CF_3$ | $CH_3$ | $CH_3$ | $CH_3$ | H | | Al | 3 |
| No. 5 | t-BU | $CF_3$ | $CH_3$ | $CH_3$ | $CH_3$ | H | | Al | 3 |
| No. 6 | Ph | i-Pr | $CH_3$ | $CH_3$ | $CH_3$ | H | | Al | 3 |
| No. 7 | Ph | $CF_3$ | $CH_3$ | $CH_3$ | $C_2H_5$ | $OCH_3$ | 1 | Al | 3 |
| No. 8 | Ph | $CF_3$ | Cyclohexyl | | $CH_3$ | Naphthyl | | Al | 3 |

In Table 2 "Ph" denotes a phenyl group, "$CF_3$" denotes a trifluoromethyl group, "$CH_3$" denotes a methyl group, "t-Bu" denotes a tertiary butyl group, "i-Pr" denotes an isopropyl group, "Cyclohexyl" denotes a six-member ring formed of $R^3$ and $R^4$ combined together, and "Naphthyl" denotes a naphthyl group formed together with a benzene ring.

For example, the No. 1 and No. 2 squaric acid complexes have the structures represented by the Formulae (6) and (7), respectively. The position of substituent $R^6$ in the No. 3 and No. 7 compounds is the same as in the Formula (7).

Formula (6)

Formula (7)

To avoid dechelation, in the present invention, an amine compound is added as a stabilizer.

Amine compounds are basic compounds which prevent oxidation (dechelation).

Meanwhile, general solvents used for the preparation of coating solution are fluorine-substituted alcohols such as 2,2,3,3-tetrafluoropropanol, in light of their high solubility for the foregoing dyes.

The acidity, water content, etc., of the solvent also influence the amine's stabilizing capability. It is, however, difficult to control these parameters and it results in high manufacturing costs. When an amine compound is a solid, it is contained in the recording layer by means of spin coating. For this reason, the content of amine compound is preferably not greater than 10% by mass of dye; a too high content influences the optical characteristics and thermophysical properties of the recording layer, increasing the likelihood of jitter increase in the recording signals.

Whereas a too low amine compound content makes it difficult to obtain the stabilizing effect. A particularly preferred amine compound content range with respect to dye is 0.5% by mass to 3% by mass.

In addition, amine compounds having a nitrogen-containing heterocyclic ring are preferable. Furthermore, amine compounds with a melting point of 150° C. or higher are preferable. The reason for this is that those with a melting point of less than 150° C. are more likely to cause changes in characteristics (particularly optical characteristics) of the light-absorbing layer when placed under high temperature, high humidity conditions. Among those amine compounds, imidazole, benzimidazole, and thiazole derivatives are most preferable.

When the amine compound is a liquid present in a small amount, the amine compound can be removed from the recording layer either during the spin coating process or following heating process.

Thus, the content of the liquid amine compound in coating solution is preferably not greater than 10% by mass as has been described above, because a content of 10% or more makes it difficult to remove the amine compound.

There is no need to allow any amine compound to exist in the resulting recording layer.

Tertiary amines (e.g., triethylamine and tripropylamine) are preferably employed in the case of a liquid amine compound, because this increases basicity of the coating solution and amine's stabilizing capability.

A dye recording layer provided for example in a DVD+R disc is generally produced by spin coating, a method that involves dropwise application of coating solution onto a rotating substrate, followed by removal or drying of solvent by further increasing the rotational speed of the substrate. This method, however, can utilize as small as 10% to 20% of the coating solution for film deposition onto the substrate, and the rest of the coating solution remains in the spin coating tank. Re-use of the tank content refers to as a "dye recycle," wherein the tank content (liquid and solids) is again dissolved in coating solvent to prepare a coating solution.

By allowing an amine compound to be present in the dye film, it can also realize recycling of dyes while ensuring the stability of coating solution.

Specific examples of amine compounds include n-butylamine, n-hexylamine, tert-butylamine, pyrrole, pyrrolidine, pyridine, piperidine, purin, imidazole, benzimidazole, 5,6-dimethylbenzimidazole, 2,5,6-trimethylbenzimidazole, naphthoimidazole, 2-methylnaphthoimidazole, quinoline, isoquinoline, quinoxaline, benzoquinoline, phenanthridine, indoline, carbazole, norharman, thiazole, benzothiazole, benzoxazole, benzotriazole, 7-azaindole, tetrahydroquinoline, triphenylimidazole, phthalimide, benzoisoquinoline-5,10-dion, triazine, perimidine, 5-chlorotriazole, ethylenediamine, azobenzene, trimethylamine, triethylamine, N,N-dimethylformamide, 1(2H)-phthalazinone, phthalhydrazide, 1,3-diiminoisoindoline, oxazole, polyimidazole, polybenzimidazole, and polythiazole.

Conventional cyanine dyes can be employed without any modification, examples of which are those disclosed in JP-B Nos. 2594443, 3698708, and 3659922.

In particular, as described above, compounds that have $PF_6^-$ as an anion are suitable for high-speed, high-density recording because they produce small amount of heat when thermally decomposed.

Conventional squaric acid complexes can be employed, as can the cyanine dyes, and examples of such squaric acid complexes are those disclosed in International Publication No. 2002/050190 and JP-A No. 2004-244342.

(Layer Configuration)

Hereinafter, materials of other layers provided in the optical recording medium of the present invention will be described in detail.

Materials of the substrate used in the present invention can be selected from any materials for use in substrates for conventional recording media; examples include acrylic resins such as polymethylmethacrylate, vinyl chloride resins such as polyvinyl chloride and polyvinyl chloride copolymers, epoxy resins, polycarbonate resins, amorphous polyolefins, polyesters, glass such as soda-lime glass, and ceramics.

Among these, polymethylmethacrylate, polycarbonate resins, epoxy resins, amorphous polyolefins, polyesters, and glass are preferable in view of their shape stability, transparency, and the ease with which they can be flattened.

Furthermore, polycarbonate resins are more preferable in view of their moldability.

A surface of the substrate over which an optical recording layer is to be deposited may be provided with an undercoat layer for the purpose of improving flatness, enhancing adhesive property, and preventing degradation of the optical recording film.

Examples of materials of the undercoat layer include polymers such as polymethylmethacrylate, acrylic acid/methacrylic acid copolymers, styrene/maleic acid anhydride copolymers, polyvinyl alcohol, N-methylolacrylamide, styrene/vinyl sulfonic acid copolymers, styrene/vinyl toluene copolymers, chlorosulfonated polyethylene, nitrocellulose, polyvinyl chloride, chlorinated polyolefins, polyesters, polyimides, vinyl acetate/vinyl chloride copolymers, ethylene/vinyl acetate copolymers, polyethylene, polypropylene, and polycarbonates; organic materials such as silane coupling agents; inorganic oxides such as $SiO_2$ and $Al_2O_3$; and inorganic materials such as inorganic fluorides such as $MgF_2$. Note that the undercoat layer generally ranges from 0.005 μm to 20 μm in thickness, preferably from 0.01 μm to 10 μm.

A pre-groove layer may be formed over the substrate or undercoat layer for the purpose of forming a tracking groove or a pattern of concaves and convexes that represents information such as address signal.

Examples of available materials of the pre-groove layer include a mixture of a photoinitiator and at least one monomer (or oligomer) selected from a monoester, diester, triester, and tetraester of acrylic acid.

Moreover, a reflective layer is provided over the optical recording layer for the purpose of increasing the S/N ratio, reflectance, and sensitivity upon recording. Light reflective materials used for manufacture of the reflective layer are materials that reflect laser beam light to a great extent; examples include metals and semi-metals such as Mg, Se, Y, Ti, Zr, Hf, V, Nb, Ta, Cr, Mo, W, Mn, Re, Fe, Co, Ni, Ru, Rh, Pd, Ir, Pt, Cu, Ag, Au, Zn, Cd, Al, Ca, In, Si, Ge, Te, Pb, Po, Sn, Si, and Nd.

Among these, Au, Al, and Ag are preferable. These metals and semi-metals may be used singly or in combination or as an alloy. Note that the reflective layer generally ranges from 100 Å to 3,000 Å in thickness.

A protective layer is provided over the optical recording layer (or reflective layer) in order to protect the optical recording layer and the like physically and chemically.

This protective layer may be provided to the other side of the substrate where no light absorbing layer is provided, for increasing scratch resistance and wet resistance. Examples of materials of the protective layer include inorganic materials containing for example $SiO$, $SiO_2$, $MgF_2$, $SnO_2$, $ZnS$, or $ZnO$ as a main ingredient, thermoplastic resins, thermosetting resins, and UV-curable resins. Note that the protective layer generally ranges from 500 Å to 50 μm in thickness.

In addition to the foregoing dye materials—cyanine dyes, squaric acid complexes and amine compounds, additional ingredient(s) may be added where necessary for the purpose of improving light stability, optical characteristics, temperature resistance, wet resistance, etc.

Examples of the additional ingredient include cyanine dyes, phthalocyanine dyes, pyrylium dyes, thiopyryliium dyes, azulenium dyes, squaric acid dyes, azo dyes, formazan chelate dyes, metal (e.g., Na and Cr) complex dyes, naphthoquinone dyes, anthraquinone dyes, indophenol dyes, indoaniline dyes, triphenylmethane dyes, triallylmethane dyes, aminium dyes, diimmonium dyes, and nitroso dyes.

The method of the present invention for manufacturing an optimal recording medium will be described below. In the method of the present invention for manufacturing an optical recording medium with a DVD-R disc configuration is characterized in that (1) an optical recording layer containing the dye compounds (I) and (II) and amine compound as main ingredients is provided on a surface of a substrate by coating means either directly or with a layer interposed between them, the surface having at least one of grooves and pits thereon, (2) a reflective layer is provided over the optical recording layer by means of vacuum deposition either directly or with a layer is interposed between them, and (3) a protective layer is provided over the optical recording layer.

That is, the method according to the present invention for manufacturing an optical recording medium comprises (1) providing an optical recording layer containing the dye compounds (I) and (II) and amine compound as main ingredients on a surface of a substrate by coating means either directly or with a layer interposed between them, the surface having at least one of grooves and pits thereon; (2) providing a reflective layer over the optical recording layer by means of vacuum deposition either directly or with a layer interposed between them; and (3) providing a protective layer over the optical recording layer.

(Optical Recording Layer Formation Step)

In the first step of the method of the present invention, an optical recording layer containing the dye compounds (I) and (II) and amine compound as main ingredients is provided on a surface of a substrate by coating means either directly or with a layer interposed between them, the surface having at least one of grooves and pits thereon. To be more specific, the dye compounds (I) and (II) and amine compound are dissolved into a solvent to produce a coating solution, which is then applied over the substrate to form the optical recording layer.

Solvents that can be used for the preparation this coating solution are known organic solvents such as alcohols, cellosolves, halogenated carbons, ketones, and ethers.

Moreover, spin coating is a preferable coating method because it is possible to control the layer thickness by adjusting the concentration and viscosity of the optical recording layer and the drying temperature of the solvent.

A surface of the substrate over which the optical recording layer is to be deposited is provided with an undercoat layer for the purpose of improving flatness, enhancing adhesive property, and preventing degradation of the optical recording film.

This undercoat layer can be formed by dissolving or dispersing any of the foregoing materials for undercoat layer into an suitable solvent and by applying the resultant coating solution over the substrate by technique such as spin coating, dip coating, or extrusion coating.

(Optical Reflective Layer Formation Step)

In the second step of the method of the present invention, a reflective layer is provided over the optical recording layer by vacuum deposition either directly or with a layer interposed between them. To be more specific, the reflective layer is deposited over the optical recording layer by vapor deposition, sputtering, or ion plating of any of the foregoing light reflective materials.

(Protective Layer Formation Step)

In the third step in the method of the present invention, a protective layer is provided over the reflective layer. To be more specific, the protective layer can be formed by vacuum deposition or application of any of the foregoing materials for protective layer, including inorganic materials and various types of resins. It is particularly preferable to adopt UV-curable resin; the protective layer is formed by applying UV-curable resin by spin coating followed by application of UV to cure the resin.

EXAMPLE

The present invention will be described with reference to Examples and Comparative Example, which however shall not be construed as limiting the invention thereto.

Example 1

A substrate with a pattern of grooves (depth=approximately 1,600 Å, width=approximately 0.24 µm, track pitch=0.74 µm) formed on a polycarbonate disc (diameter=120 mm, thickness=0.6 mm) was prepared. Subsequently, the No. 1 dye in Table 1 (Cyanine Dye (I)), the No. 2 dye in Table 2 (Squaric Acid Complex (II)), and 5,6-dimethylbenzimidazole (Amine Compound) were mixed together in 2,2,3,3-tetrafluoropropanol to produce a coating solution for dye recording layer.

The dye compounds were dissolved in the solvent by stirring at 60° C. for 5 hr, and the obtained coating solution was applied by spin coating and annealed at 90° C. for 15 min to form a dye recording layer of about 800 Å thickness.

Figure 3:
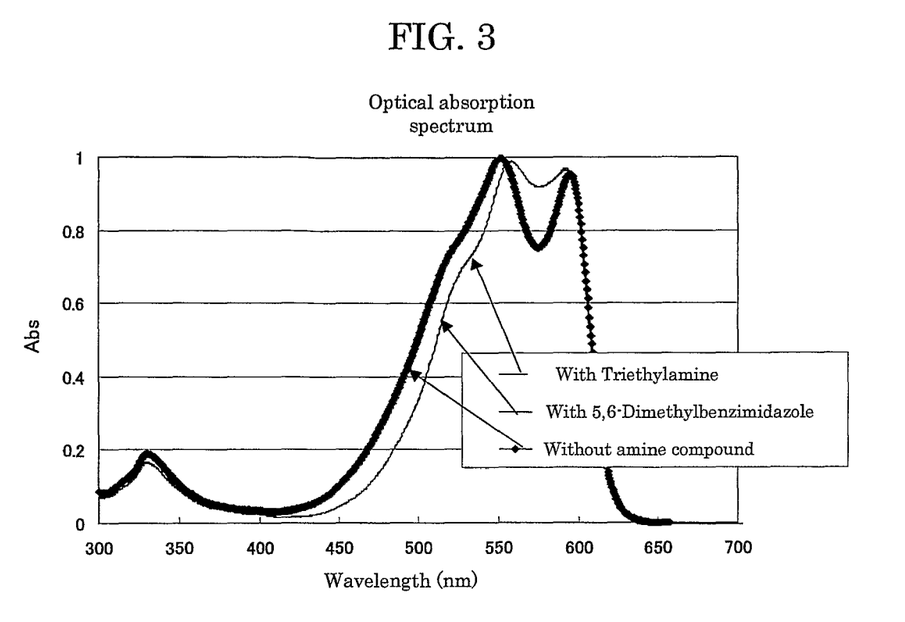
FIG. 3 shows optical absorption spectra of dye films in Examples and Comparative Example.

The dye concentration was set to 1.0%, and the Dye (1): Dye (2):Amine Compound ratio was set to 60:39:1 (by mass). The optical absorption spectrum of the coating solution is shown in FIG. 3.

A reflective layer was then deposited on the recording layer by sputtering of a Ag alloy (Ag/IN=99.5/0.5) to a thickness of 1,400 Å using Ar gas as sputtering gas.

A protective layer made of UV-curable resin was formed on the reflective layer to a thickness of about 4 µm to fabricate a disc-shaped article, which was then bonded to a polycarbonate cover substrate of similar shape with a UV-curable resin adhesive. In this way a DVD+R disc was manufactured.

The recording medium was evaluated using disc evaluation equipment (ODU-1000 and DDU-1000 by PulseTec) under the evaluation conditions described below.

(Signal Recording)

DVD(8-16) signals were recorded under the following condition: laser wavelength=659 nm, lens NA=0.65, recording linear velocity=16× (55.8 m/s). A write strategy based on the DVD+R standards was adopted.

(Signal Recording)

The disc was played on a DVD-ROM player (lens NA=0.60, laser wavelength=650 nm) at 1× (3.5 m/s), measuring the jitter of pit edge-clock (σ/T) by Time Interval Analyzer. In addition, reflectance to reflection signals was measured. It succeeded in obtaining such excellent signal characteristics that σ/T was 7.2% and reflectance was 48%.

Comparative Example 1

An optical recording medium was manufactured as in Example 1 except that no amine compound was added, and a similar signal evaluation was made. The optical absorption spectrum of the dye coating solution prepared upon manufacture of this optical recording medium is shown in FIG. 3, which is different from that of the dye coating solution prepared in Example 1.

The result of the signal evaluation was as follows: π/T was 9.5% and reflectance was 41%. This means that signal characteristics of Comparative Example 1 was poor compared to Example 1 (i.e., σ/T increased and reflectance decreased), resulting in failure to meet the DVD+R standards.

Example 2

Preparation of Dye Coating Solution was Conducted as in Example 1 except that dye coating solutions containing different amounts of amine compound (0.5, 2, 3, 5, 8, and 10 wt %) were prepared, and their optical absorption spectra were measured. It turned out that the absorption spectra were similar to that obtained in Example 1.

Example 3

A Dye Coating Solution was Prepared as in Example 1 Except that the amine compound was changed from 5,6-dimethylbenzimidazole to triethylamine, and the optical absorption spectrum was measured. As shown in FIG. 3, it turned out that the optical absorption spectrum was similar to that obtained in Example 1. Also, it succeeded in obtaining such excellent signal characteristics that σ/T was 7.5% and reflectance was 48%.

Example 4

A DVD+R disc was manufactured as in Example 1 except that the amine compound was changed from 5,6-dimethylbenzimidazole to triethylamine, and the absorption spectrum was measured. It succeeded in obtaining such excellent signal characteristics that σ/T was 7.5% and reflectance was 48%.

Examples 5 to 10

DVD+R media were manufactured as in Example 4 except that compounds and their ratios listed in Examples 5 to 10 of Table 3 were adopted, and then signal evaluations were made.

The evaluation results shown in Table 3 indicate that all of the DVD discs prepared in Examples 5 to 10 offered excellent signal characteristics.

Note in Table 3 that the cyanine dye number "No." corresponds to the dye number of Table 1, the squaric acid complex number "No." corresponds to the dye number of Table 2, "DMBi" stands for 5,6-dimethylbenzimidazole, "Bi" stands for benzimidazole, and "TEA" stands for tetraethylamine.

TABLE 3

| | Cyanine dye | Squaric acid complex | Amine compound | Ratio I/II/Amine | σ/T Jitter (%) | Reflectance R14H(%) |
|---|---|---|---|---|---|---|
| Ex. 1 | No. 1 | No. 2 | DMBi | 60/39/1 | 7.2 | 48 |
| Ex. 4 | No. 1 | No. 2 | TEA | 60/39/1 | 7.5 | 48 |
| Ex. 5 | No. 2 | No. 2 | DMBi | 60/39/1 | 7.2 | 46 |
| Ex. 6 | No. 5 | No. 2 | DMBi | 65/34/1 | 6.9 | 46 |
| Ex. 7 | No. 1 | No. 4 | DMBi | 65/34/1 | 7.4 | 49 |
| Ex. 8 | No. 1 | No. 1 | Bi | 50/49/1 | 7.8 | 45 |
| Ex. 9 | No. 2 | No. 2 | TEA | 60/39/1 | 7.5 | 46 |
| Ex. 10 | No. 5 | No. 2 | TEA | 65/34/1 | 7.1 | 46 |
| Compara. Ex. 1 | No. 1 | No. 2 | — | 60/40/0 | 9.5 | 41 |
| Ex. 11 | No. 1 (ClO$_4$ anion) | No. 2 | DMBi | 60/39/1 | 8.8 | 47 |
| DVD+R standard value | | | | | 9 or less | 45 or more |

Example 11

A DVD+R disc was manufactured as in Example 1 except that the anion of the cyanine dye was changed to ClO$_4^-$, and then a signal evaluation was made. The evaluation result shown in Table 3 indicates that it succeeded in obtaining excellent signal characteristics.

The invention claimed is:

1. An optical recording medium comprising:
a substrate having at least one of grooves and pits on a surface thereof; and
a dye recording layer formed over the substrate,
wherein the dye recording layer comprises a cyanine dye represented by the following General Formula (I), a squaric acid complex represented by the following General Formula (II), and an amine compound:

General Formula (I)

wherein R$^1$ and R$^2$ in General Formula (I) may be identical or different, and represent an alkyl group which may be substituted, an aryl group which may be substituted, or a benzyl group which may be substituted, Z represents an atom group for forming an aromatic ring, X represents a monovalent anion, and L represents CH=CH—CH, General Formula (II)

wherein R$^1$ and R$^2$ in General Formula (II) may be identical or different, and are an alkyl group which may be substituted, an aralkyl group which may be substituted, an aryl group which may be substituted, or a heterocyclic ring which may be substituted, Q represents a metal atom which has a coordinating property, q represents an integer of 2 or 3, and A represents an aryl group which may be substituted, a heterocyclic ring which may be substituted, or Y=CH— where Y represents an aryl group which may be substituted or a heterocyclic ring which may be substituted, and
wherein the amine compound has a melting point of 150° C. or higher.

2. The optical recording medium according to claim 1, wherein the cyanine dye in the recording layer has PF$_6^-$ as an anion.

3. The optical recording medium according to claim 1, wherein the content of the amine compound in the recording layer is 10% by mass or less.

4. The optical recording medium according to claim 1, wherein the amine compound is a nitrogen-containing heterocyclic compound.

5. A method for manufacturing an optical recording medium, comprising:
applying over a surface of a substrate a solvent in which at least a cyanine dye represented by the following General Formula (I), a squaric acid complex represented by the following General Formula (II), and an amine compound are dissolved, to thereby form a dye recording layer over the substrate,
wherein the optical recording medium comprises the substrate having at least one of grooves and pits on a surface thereof, and the dye recording layer formed over the substrate:

General Formula (I)

wherein R$^1$ and R$^2$ in General Formula (I) may be identical or different, and represent an alkyl group which may be substituted, an aryl group which may be substituted, or a benzyl group which may be substituted, Z represents an atom group for forming an aromatic ring, X represents a monovalent anion, and L represents CH=CH—CH, General Formula (II)

wherein $R^1$ and $R^2$ in General Formula (II) may be identical or different, and are an alkyl group which may be substituted, an aralkyl group which may be substituted, an aryl group which may be substituted, or a heterocyclic ring which may be substituted, Q represents a metal atom which has a coordinating property, q represents an integer of 2 or 3, and A represents an aryl group which may be substituted, a heterocyclic ring which may be substituted, or Y=CH— where Y represents an aryl group which may be substituted or a heterocyclic ring which may be substituted, and wherein the amine compound has a melting point of 150° C. or higher.

6. The method for manufacturing an optical recording medium according to claim 5, wherein the solvent is a fluorine-substituted alcohol.

7. A method for manufacturing an optical recording medium, comprising:

applying over a surface of a substrate a solvent in which at least a cyanine dye represented by the following General Formula (I), a squaric acid complex represented by the following General Formula II, and an amine compound are dissolved, to thereby form a dye recording layer over the substrate, wherein the optical recording medium comprises the substrate having at least one of grooves and pits on a surface thereof, and the dye recording layer formed over the substrate:

General Formula (I)

wherein $R^1$ and $R^2$ in General Formula (I) may be identical or different, and represent an alkyl group which may be substituted, an aryl group which may be substituted, or a benzyl group which may be substituted, Z represents an atom group for forming an aromatic ring, X represents a monovalent anion, and L represents CH=CH—CH, General Formula (II)

wherein $R^1$ and $R^2$ in General Formula (II) may be identical or different, and are an alkyl group which may be substituted, an aralkyl group which may be substituted, an aryl group which may be substituted, or a heterocyclic ring which may be substituted, Q represents a metal atom which has a coordinating property, q represents an integer of 2 or 3, and A represents an aryl group which may be substituted, a heterocyclic ring which may be substituted, or Y=CH— where Y represents an aryl group which may be substituted or a heterocyclic ring which may be substituted, and wherein the amine compound is a liquid tertiary amine.

* * * * *